United States Patent

Mitwalsky et al.

[11] Patent Number: 5,609,148
[45] Date of Patent: Mar. 11, 1997

[54] METHOD AND APPARATUS FOR DICING SEMICONDUCTOR WAFERS

[75] Inventors: Alexander Mitwalsky; Katsuya Okumura, both of Poughkeepsie, N.Y.

[73] Assignees: Siemens Aktiengesellschaft, Munich, Germany; Kabushiki Kaisha Toshiba, Japan

[21] Appl. No.: 414,871

[22] Filed: Mar. 31, 1995

[51] Int. Cl.$^6$ .................................................... B28D 1/06
[52] U.S. Cl. ........................ 125/16.01; 451/364; 451/388; 451/385
[58] Field of Search ............................... 125/16.01, 16.02, 125/20, 19, 17; 451/388, 365, 364, 385, 164, 168

[56] References Cited

U.S. PATENT DOCUMENTS

| | | | |
|---|---|---|---|
| 2,394,376 | 5/1945 | Grylewicz et al. | 451/385 |
| 3,032,026 | 5/1962 | Raabe . | |
| 3,089,371 | 5/1963 | Spears . | |
| 3,142,905 | 8/1964 | Strasbaugh . | |
| 3,435,815 | 4/1969 | Forcier | 125/16.01 |
| 3,478,732 | 11/1969 | Clark et al. . | |
| 3,673,016 | 6/1972 | Gerstner . | |
| 3,809,950 | 5/1974 | Chough et al. | 451/364 |
| 3,942,508 | 3/1976 | Shimizu | 125/16.01 |
| 4,092,972 | 6/1978 | Kurokawa | 125/16.01 |
| 4,191,159 | 3/1980 | Collins . | |
| 4,274,389 | 6/1981 | White et al. . | |
| 4,603,466 | 8/1986 | Morley | 451/388 |
| 4,646,710 | 3/1987 | Schmid et al. . | |
| 4,967,725 | 11/1990 | Hinzen . | |
| 5,201,305 | 4/1993 | Takeuchi . | |
| 5,240,882 | 8/1993 | Satoh et al. . | |
| 5,269,285 | 12/1993 | Toyama et al. . | |

FOREIGN PATENT DOCUMENTS 717874   11/1954   United Kingdom ................ 125/16.02

*Primary Examiner*—Bruce M. Kisliuk
*Assistant Examiner*—George Nguyen
*Attorney, Agent, or Firm*—Adel A. Ahmed

[57] ABSTRACT

A method and apparatus for dicing a semiconductor wafer in which the wafer is bowed or bent by forcing it into contact with a spherical surface having parallel grooves therein and in which an array of parallel wire saws that are in registration with the grooves is forced against the wafer for sawing parallel channels therethrough. A second array of parallel wire saws that are orthogonal to the wires of the first array is provided spaced therefrom for sawing parallel channels through the wafer that are orthogonal to the channels produced by the first array of parallel wire saws.

15 Claims, 5 Drawing Sheets

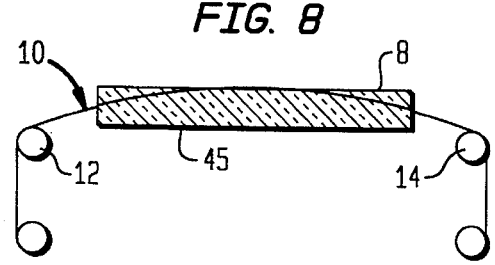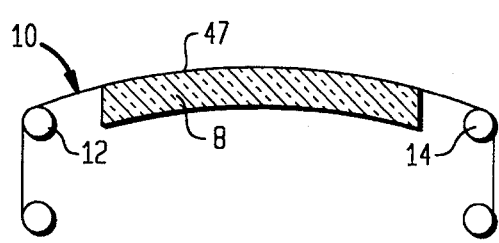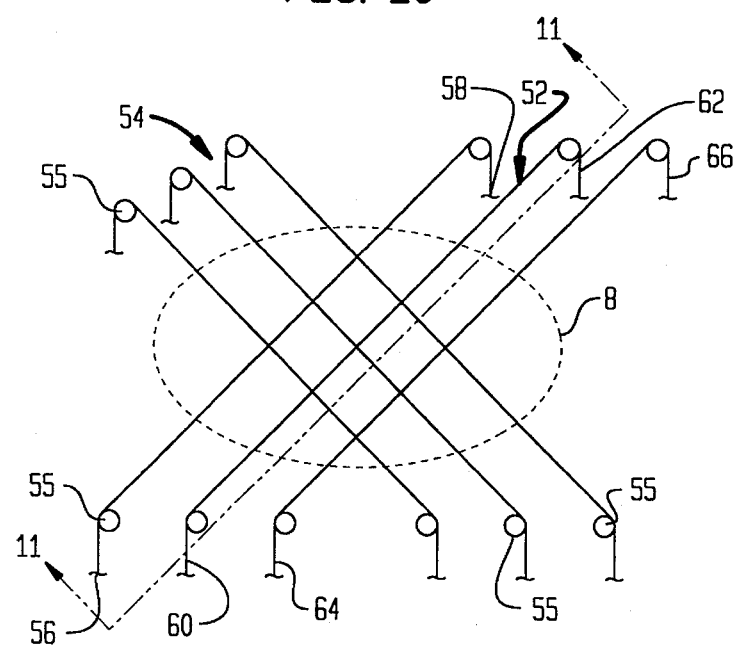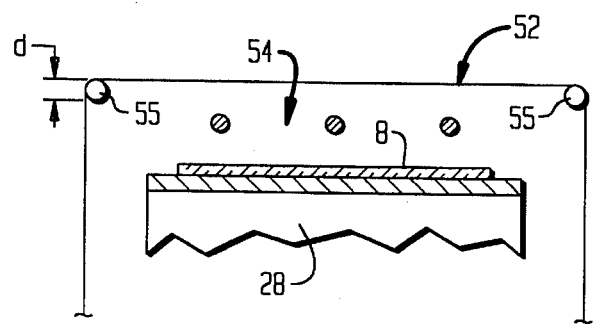

5,609,148

METHOD AND APPARATUS FOR DICING SEMICONDUCTOR WAFERS

FIELD OF THE INVENTION

This invention is in the field of dicing semiconductor wafers and substrates.

BACKGROUND OF THE INVENTION

In the manufacture of semiconductor devices, crystals of semiconductor material are grown to produce a cylinder that is sliced perpendicularly to its axis to form wafers. Doped layers are formed on a wafer as required for the type of device involved, and the wafer with its doped layers is then cut into rectangular sections or chips to form identical devices or chips by a process referred to as dicing.

Dicing apparatus described in U.S. Pat. No. 3,478,752 is comprised of spaced parallel drums having helical grooves in which between a supply reel and a take-up reel is wound so as to only contact the remote sides of the drums. The wire sections between the tops and bottoms of the drums are placed under tension by forcing the drums apart. The flat wafer to be diced is adhered by wax to a flat glass slide or base that is held in position by a vacuum chuck. The sections of the wire that are tangent to the bottoms of the drums as well as the section between the top sides of the drums are in planes that are parallel to the planar surface of the wafer, and channels are cut through the wafer by forcing the open wire sections having portions tangent to the bottoms of the drums wire into contact with it. When the wire sections emerge from the other side of the wafer, they pass into the wax support. The wires are then drawn back through the channels they have just cut, the wafer is rotated by 90°, and the wires are once again brought to bear against the wafer to cut orthogonal channels therethrough so that the wafer is diced.

Because of the helical progression of the wires about the drums, there is a lateral force between each wire section and one sidewall of each channel it is cutting that can cause the strips into which the wafer is cut after the first cutting to become misaligned just as the cutting is finished. Thus the location of the channels formed by the second cutting may not be truly orthogonal. This is possible because the wires can exert lateral forces on the strips through the wax. In fact, the strips may be turned at different angles so that the sides of the chips formed during the second cutting may have respectively different angles with respect to the sides cut during the first cutting. Thus the semiconductor devices formed by dicing the wafer may not be identical as is desired.

Furthermore, regardless of the tension on the wires, they start cutting the wafer at its outer edges, and the cutting gradually proceeds to the center of the wafer so that the wires may have a component of bending or bowing in a plane that is vertical with respect to the plane of the wafer. Because of the helical winding of the wire about the drums, the wire turns may also have a component of bending or bowing in a plane parallel to the wafer that causes the channels to be other than vertical. Thus, in these or other ways, the unavoidable bending or bowing of the wires can result in the devices cut from the wafer being nonuniform.

SUMMARY OF THE INVENTION

In accordance with one aspect of this invention, the wafer is mounted on a firm base rather than a pliable one like wax, and grooves are cut in the base for receiving the wires as they emerge from the wafer so as to prevent them from exerting forces on the wafer after the first cutting.

Another aspect of the invention is the bending or curving the base on which the wafer is mounted in the direction of the bending or bowing of the wires during cutting, thereby permitting the wires to start cutting into the wafers for most of their entire length at the same time. This results in less bowing or bending of the wires so that the devices cut from the wafer are uniform.

Furthermore, instead of using one array of cutting wires so as to cut the orthogonal channels in sequence, two arrays of wires are used to cut the orthogonal channels at nearly the same time and thus reduce the time for dicing a wafer by nearly 50%. In order to do this, the vertical separation between the initial planes of the orthogonal arrays of wires must be as small a fraction of the thickness of the wafer as possible so as to minimize the difference between time when the first array finishes cutting channels in the wafer and the time when the second array finishes cutting orthogonal channels. By curving the base on which the wafer is mounted as described above, the bending or bowing of both arrays of wires is reduced so that they can be significantly closer together without interfering with each other.

Another aspect of the invention is the use of separate wires for cutting each channel so as to reduce or eliminate the lateral forces resulting from a single wire that is wound in a helical fashion.

BRIEF DESCRIPTION OF THE DRAWINGS

Various embodiments of the present invention are shown and described herein with reference to drawings, in which like items are identified by the same reference designation, wherein:

FIG. 8 is a partial cross sectional view illustrating the bowing or bending of a wire saw when the wafer is not bowed;

FIG. 9 is a partial cross sectional view illustrating the bowing or bending of a wire saw when the wafer is bowed;

FIG. 10 is an isometric view of apparatus having orthogonal arrays of wire saws that are spaced apart;

FIG. 11 is a cross sectional view taken along 11—11 of FIG. 10;

DETAILED DESCRIPTION OF THE DRAWINGS

Figure 1:
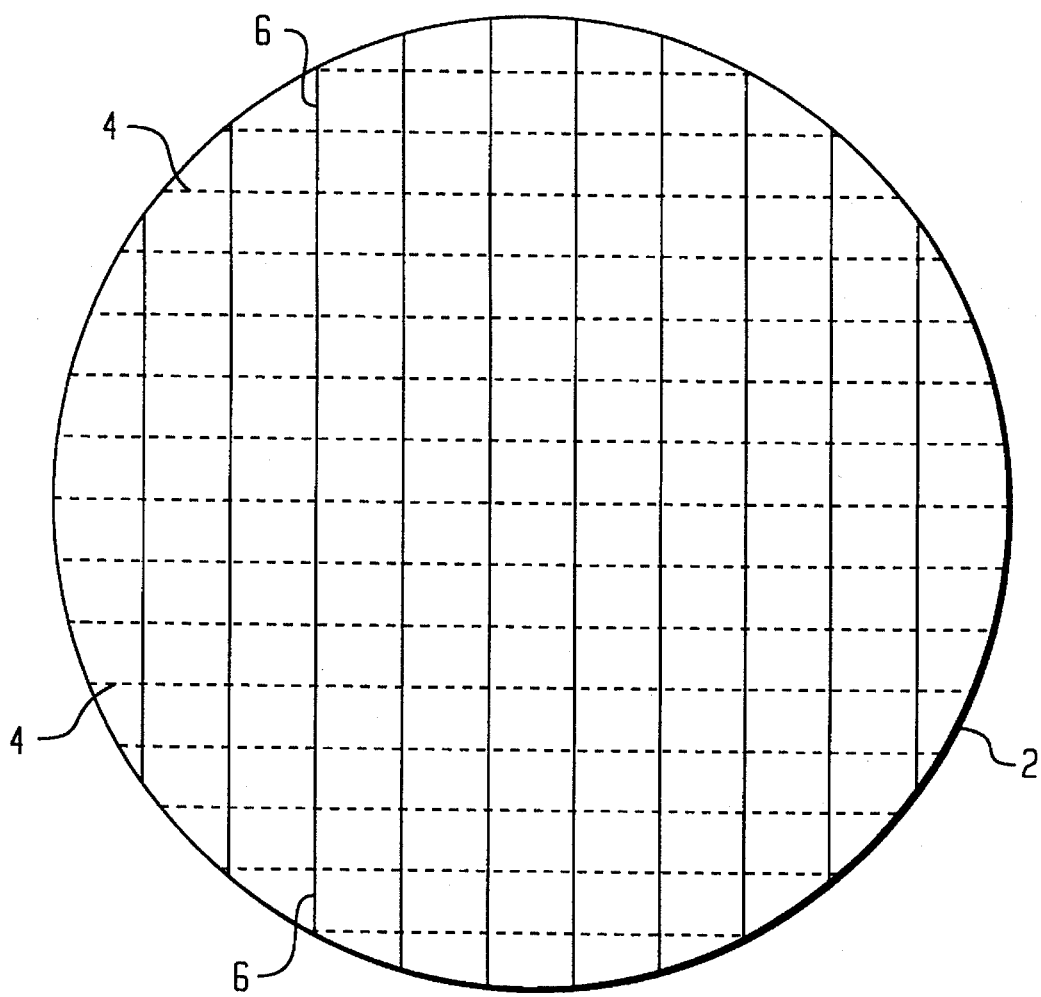
FIG. 1 shows the channels to be cut through a semiconductor wafer in the present dicing process.

FIG. 1 shows a typical semiconductor wafer 2 and the channels that are to be cut in it during a dicing operation to divide it into 118 chips. Seventeen parallel channels indicated by dashed lines such as 4 are cut in one direction, and ten parallel channels indicated by the solid lines such as 6 are cut in an orthogonal direction. A typical diameter of the wafer 2 is 200 mm, and a typical thickness is 0.75 mm. The thickness of the channels is about 50 um.

Using an array of wire saws to cut the channels 4 and 6 is much faster than using a circular saw because the wires only have to cut through the thickness of the wafer 2 whereas the circular saw has to cut the channels in sequence, a distance of about 4400 mm. Furthermore, the higher temperatures created by a circular saw can damage the chips.

Figure 2:
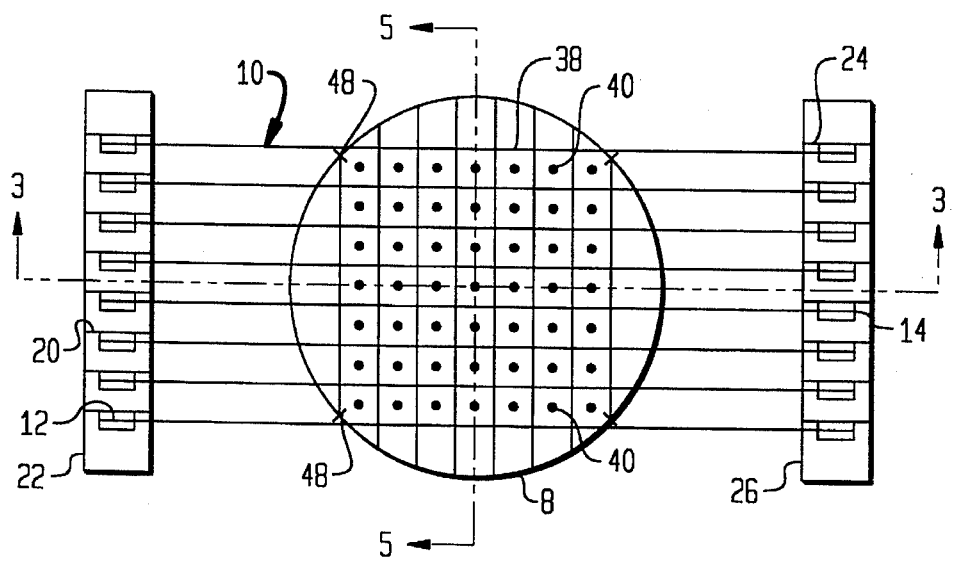
FIG. 2 is a top view of a wafer being diced by apparatus constructed in accordance with this invention in which only one set of wire saws is used.
Figure 3:
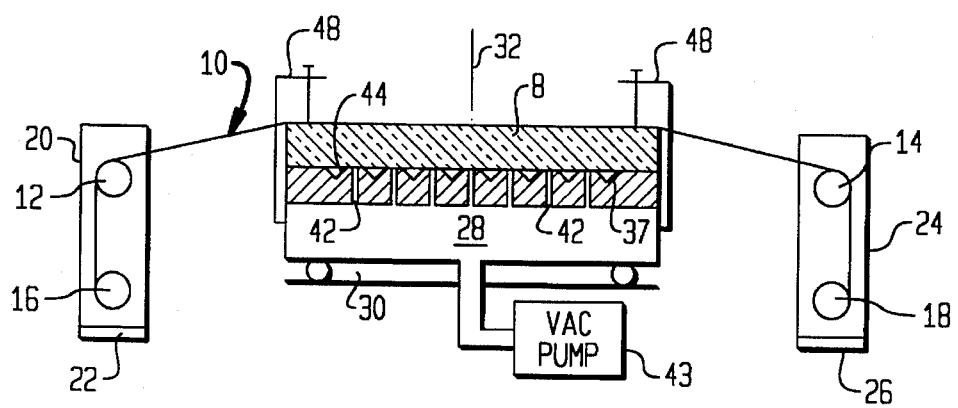
FIG. 3 is a partial cross sectional view taken along 3—3 of FIG. 2 in which the wafer is not bowed.

FIG. 2 is a view looking down on a wafer 8 in which eight channels are being cut by an array 10 of parallel wires. Although these wires could be sections of a single wire that is helically wound about drive rollers, as in the above-identified patent it is preferable, in accordance with one aspect of this invention, that individual wires be used. Each of the wires in the array 10 runs between respective pulleys such as 12 on one side of the wafer 8 and a respective pulley such as 14 on the other side of the wafer 8. And, as shown in FIG. 3, a wire from the array 10 runs from a pulley 12 to a reel 16 and from a pulley 14 to a reel 18. Several modes of operation are possible. Each wire can continuously move in one direction from its reel 16 and taken up by its reel 18, or vice versa, until all the wire is moved from one reel to the other or the reels 16 and 18 can be rapidly reversed in direction so that a wire moves back and forth. In either case, ultrasonic longitudinal vibration can be induced in the wires.

As shown in FIG. 3, the pulley 12 shown therein and the reel 16 shown therein are mounted for rotation on a vertical member 20, and as shown in FIG. 2, the lower end of the member 20 is mounted perpendicularly on a base 22. Similarly the pulley 14 shown therein and the reel 18 shown therein are respectively mounted on vertical members 24 having an end mounted on a base 26. Thus, the array of wires 10 can be moved vertically by moving the bases 22 and 26.

Modifications of the apparatus just described will occur to those skilled in the art. For example, the pulleys 12 and 14 could be replaced by respective cylinders as could the reels 16 and 18. Whether square or round in cross section, the wires 10 would typically cut a channel of 50 um. Wire saws suitable for the purposes of this invention are available from South Bay Technologies in the U.S., or Well of Switzerland.

Figure 5:
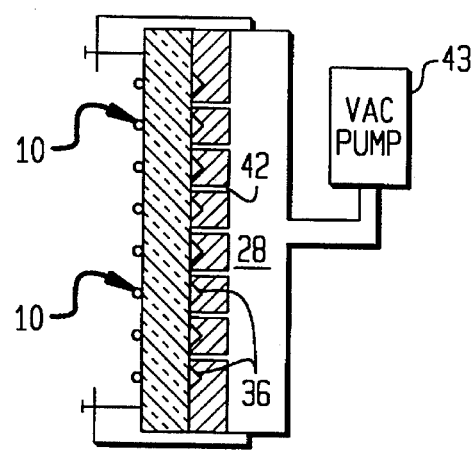
FIG. 5 is a partial cross sectional view taken along 5—5 of FIG. 2 in which the wafer is not bowed.

As shown in FIG. 3, the array of wires 10 is lowered until it is in contact with the wafer 8, which is mounted on a base 28. The base 28 is attached to a bearing race or rotatable platform 30 so that it and the wafer 8 can be rotated about an axis 32, for example. As the array of wires 10 is lowered, the wires cut channels in the wafer 8 that are in registration with the wires 10 in FIG. 2. After these channels are cut, the platform 30 is rotated by 90° so as to bring channel locations noted by the vertical lines 34 of FIG. 2 in registration with the wires of the array 10. This is illustrated in the view of FIG. 5 taken along 5—5 of FIG. 2.

In accordance with one aspect of the invention, grooves are formed in the top of the base 28 to receive the wires of the array 10 after they have cut through the wafer 8. Grooves 36 in FIG. 5 receive the wires of the array 10 when they are oriented with respect to the wafer 8 as in FIG. 2, and grooves 37 in FIG. 3 receive the wires of the array 10 when they are aligned with the lines 34. The wafer 8 is thus diced into sections 38 indicated in FIG. 2 that are defined by the wires of array 10 and the vertical lines 34. Only those square sections having dots such as 40 are useful as semiconductor devices.

As shown in FIG. 3, passageways 42 are provided in the top 44 of the base 28 that are in registration with the dots 40, ie at the centers of the individual square sections or chips into which the wafer 8 is diced. A vacuum pump 43 reduces the pressure within the base 28 so as to suck the wafer 8 down onto base 28. When both orthogonal channels have been cut in the wafer 8, the suction holds the chips in place so that they don't fly about as the second set of channels are completely cut. The passageways 42 could be merely holes if the top of the base 28 is thin.

Figure 4:
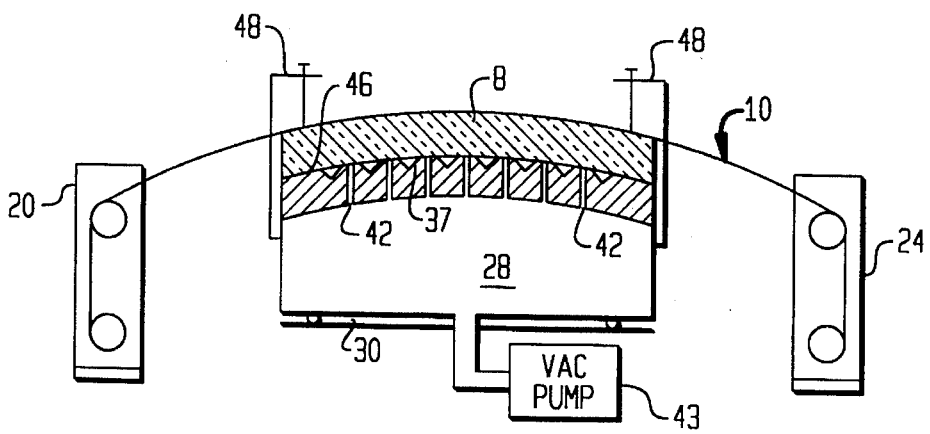
FIG. 4 is a partial cross sectional view taken along 3—3 of the apparatus of FIG. 2 in which the wafer is bowed, in a preferred embodiment of the invention.
Figure 6:
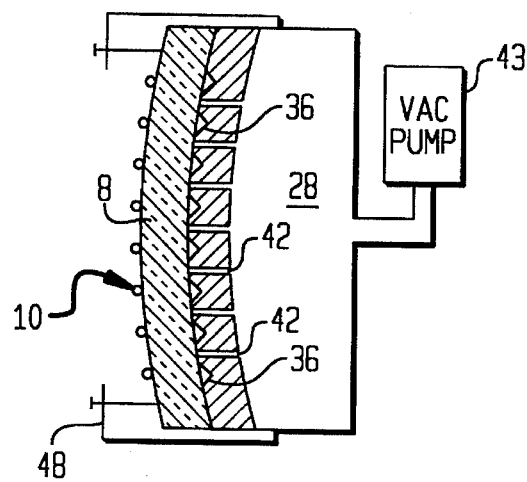
FIG. 6 is a partial cross sectional view taken along 5—5 of the apparatus of FIG. 2 in which the wafer is bowed as preferred.
Figure 7:
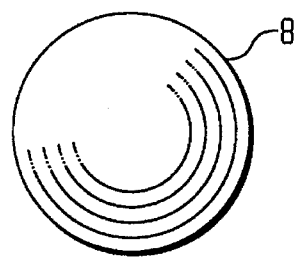
FIG. 7 is a top view of a wafer that is bowed so as to have a spherical surface.

In accordance with another aspect of this invention, the top surface of the base 28 instead of being planar as indicated at 44 in FIG. 3 is curved as indicated at 46 in FIG. 4. Although different curved shapes may be used, a spherical one as illustrated in FIG. 7 is preferable. Whatever the shape, the vacuum drawn in the base 28 by the pump 43 will pull the adjacent surface of the wafer 8 into intimate contact with the curved surface at 46. The other surface of the wafer 8 will have a like curvature. This function could be attained by clamps 48 that are attached around the periphery of the base 28 or by the clamps 48 and the vacuum in combination. FIG. 6 is a cross sectional view taken along 6—6 of FIG. 2 in which the wires of the array 10 are in end view as they contact the spherical surface of the wafer 8, and wherein the grooves 36 into which they pass when the cut is completed are also shown.

The advantage of the curved surface 46 is illustrated by a comparison of FIGS. 8 and 9. FIG. 8 shows the position of a wire in the array 10 just as its center portion is starting to cut into the center of a wafer 8 that has a flat bottom surface 45 like the flat surface 44 at the top of the base 28 in FIG. 3. Considerable bending or bowing of the wire of wire array 10 is present because it starts cutting at the outer edges of the wafer 8 before it starts cutting at the center of the wafer 8. FIG. 9 shows the position of a wire in the array 10 just as its center portion is starting to cut into the center of a wafer 8 that has a curved surface 47 like the curved surface 46 at the top of the base 28 in FIG. 4. The bowing or bending of the wires in the array 10 is less because the wires start cutting at the center of the wafer 8 at or slightly after they start cutting into the outer edges.

Although individual wires in the array 10 are preferable to the use of a single helically wound wire as in the patent referred to above, the reduction in the bowing of a wire resulting from a wafer 8 having a curved surface would be advantageous if a single wire is used.

If a single array of wires 10 is used, the chips are necessarily square, but rectangular chips that are not square could be produced by using two orthogonal and vertically displaced arrays with different spacing between the wires. Time is lost because one set of channels must be completed before the orthogonal set can be cut.

In accordance with an important aspect of this invention, time is saved by cutting the orthogonal channels at nearly the same time with one array of wire saws following closely after the other. The larger the bending or bowing of the wires of the array making the first cut the greater must be the distance between the arrays in order to prevent interference between them. Therefore, the reduction in the bowing or bending of the wires by making the surface facing the wires curved, as explained in connection with FIGS. 8 and 9, is of importance because it reduces the time for dicing a wafer 8 by permitting the two wire arrays to be closer together. It is also important that grooves such as 36 (see FIGS. 5 and 6) or 37 (see FIGS. 3 and 4) be provided in the top of the base 28, as shown, for at least the array of wires making the first cut. If those grooves for the first channels cut are deep enough, the other array of wires can cut through the wafer 8 to the base 28 without touching the wires of the first array. Alternatively grooves could be provided for both arrays of wires such as the grooves 36 and 37.

FIG. 10 shows the general arrangement for the nearly simultaneous use of orthogonal arrays 52 and 54, and FIG. 11 shows a partial cross sectional view taken along 11—11 of FIG. 10, wherein there is a distance d between the planes of the wires in the arrays 52 and 54 before the array 54 has come into contact with the wafer 8. With a wafer 8 having a thickness of 75 um, and the separation d being not less than 10 um it would only require 8% more time than the time for one cut to complete the second.

Although not preferred for the reasons given, each array of wires 52, 54 shown in the various figures of the drawings could be helically wound about parallel drums. In FIG. 10, for example, wire of the array 52 could be passed by suitably located pulleys/drive pulleys 55, not all are shown, between the points 56, 58, 60, 62, 64, 66 and back to 56. The array 54 could be guided likewise.

Figure 12:
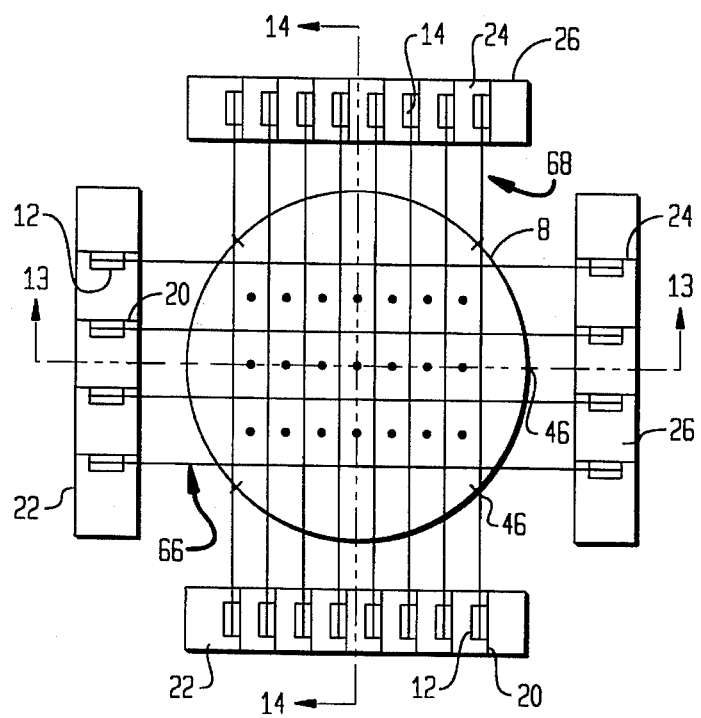
FIG. 12 is a top view of a wafer being diced by a preferred specie of the apparatus of this invention having orthogonal arrays of wire saws.
Figure 14:
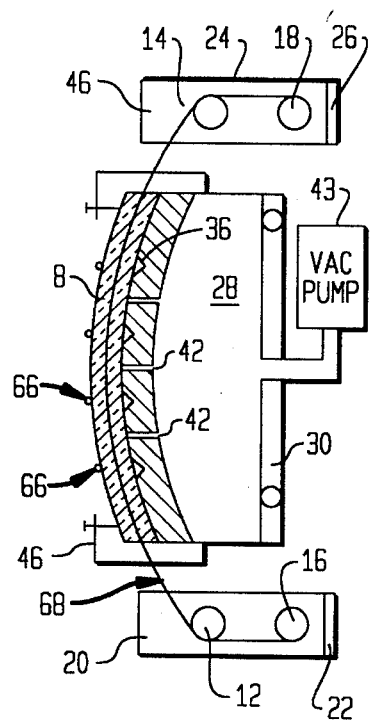
FIG. 14 is a cross sectional view taken along 14–14 of FIG. 12.
Figure 13:
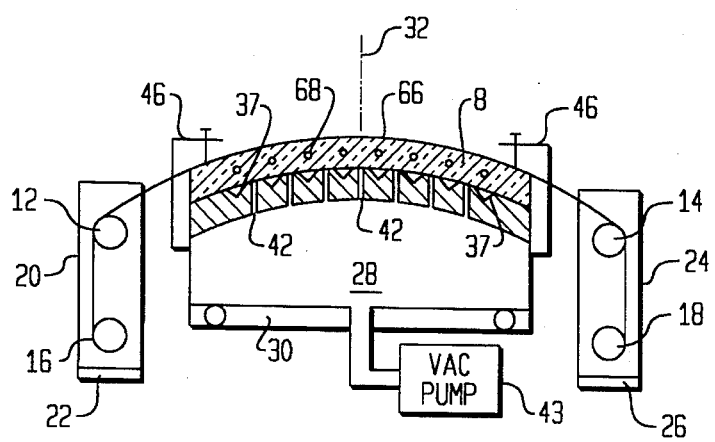
FIG. 13 is a cross sectional view taken along 13—13 of the apparatus of FIG. 12.

FIGS. 12, 13 and 14 illustrate a two array apparatus in greater detail. In order that chips diced from a wafer 8 have a length different from their width, one array 66 is shown as having four horizontal wires and the other array 68 is shown as having eight vertical wires. The wires in each array 66, 68 are moved longitudinally to produce a sawing action and moved up and down with respect to the base 28 in the same manner as described in connection with FIGS. 2 and 3. The parts of the apparatus related to supporting and moving the array 66 that correspond to the parts related to supporting and moving the array 10 of FIGS. 2 and 3 are indicated by the same numerals, and the parts of the apparatus related to supporting and moving the array 68 that correspond to the parts related to supporting and moving the array 10 of FIGS. 2 and 3 are indicated by the same numerals primed.

In FIGS. 13 and 14, the wires of the array 68 are shown as having sawed part way into the wafer 8, and the wires of the array 66 are shown as just starting to saw the wafer 8.

Although various embodiments of the invention have been shown and described herein, they are not meant to be limiting. Those of skill in the art may recognize various modifications to these embodiments, which modifications are meant to be covered by the spirit and scope of the appended claims.

What is claimed is:

1. Apparatus for dicing a semiconductor wafer comprising:
   a base having a surface for receiving and retraining said semiconductor wafer for dicing;
   means for holding said semiconductor wafer in contact with said surface;
   a first array of parallel wires;
   a second array of parallel wires;
   means for tensioning said wires;
   means for moving the wires of said first and second arrays longitudinally;
   means for holding, said first and second arrays of wires over said surface at a given distance from each other in such manner that the wires of the first array are closer to the surface of said base and orthogonal with respect to the wires of the second array; and
   means for successively moving said first and second arrays of wires in a direction perpendicular to said surface for sawing through said semiconductor wafer.

2. Apparatus as set forth in claim 1 further comprising:
   grooves in said surface in registration with the wires of said second array.

3. Apparatus as set forth in claim 1, wherein the given distance is less than the thickness of a wafer to be diced.

4. Apparatus as set forth in claim 1, wherein the wires of each of said first and second arrays are individual wires.

5. Apparatus as set forth in claim 1, wherein the wires of each of said first and second arrays are turns of a single wire respectively.

6. Apparatus as set forth in claim 1 further comprising:
   grooves in said surface in registration with the wires of said first array.

7. Apparatus as set forth in claim 1, wherein said surface of said base is curved.

8. Apparatus as set forth in claim 1, wherein said surface of said base is spherical.

9. Apparatus as set forth in claim 1, wherein said means for holding a wafer in contact with said surface comprises:
   means defining passageways extending into said base from said surface; and
   means for producing a vacuum in said passageways.

10. Apparatus as set forth in claim 1, wherein said means for holding a wafer in contact with said surface comprises:
    a plurality of clamps attached around the periphery of said base that are adapted to be adjusted to exert force toward the base around the periphery of a wafer placed on said base.

11. Apparatus as set forth in claim 1, wherein said means for holding a wafer in contact with said surface comprises:
    a plurality of clamps attached around the periphery of said base that are adapted to be adjusted to exert force toward the base around the periphery of a wafer placed on said base.

12. A method for dicing a semiconductor wafer comprising the steps of:
    forming a first array of parallel wires saws;
    forming a second array of parallel wires saws independent of said first array of parallel wires saws;
    retaining said first and second arrays of wire saws spaced apart and with their respective wire saws orthogonal to one another;
    retaining said semiconductor wafer on a rigid surface;
    moving the wire saws of said first and second arrays longitudinally;
    moving said first and second arrays of wire saws successively in a direction perpendicular to an exposed face of and through said semiconductor wafer for dicing the wafer.

13. The method of claim 12, wherein said retaining step further includes the step of slightly bending said semiconductor wafer into a spherical configuration preparatory for dicing.

14. The method of claim 12, wherein the spacing between said first and second arrays of wire saws is less than the thickness of said semiconductor wafer.

15. The method of claim 12, wherein said moving step further includes moving said first and second wire saws in unison.

* * * * *